(12) United States Patent
Lemoff et al.

(10) Patent No.: US 6,990,111 B2
(45) Date of Patent: Jan. 24, 2006

(54) ADAPTIVE PATH DISCOVERY PROCESS FOR ROUTING DATA PACKETS IN A MULTINODE NETWORK

(75) Inventors: Brian E. Lemoff, Union City, CA (US); Jonathan P. R. Lacey, Menlo Park, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 836 days.

(21) Appl. No.: 09/872,431

(22) Filed: May 31, 2001

(65) Prior Publication Data

US 2002/0181402 A1 Dec. 5, 2002

(51) Int. Cl.
*H04L 12/28* (2006.01)
*H04L 12/56* (2006.01)

(52) U.S. Cl. .................. 370/400; 370/248; 370/355; 370/409; 370/395.71; 370/408; 370/351

(58) Field of Classification Search ............. 370/248, 370/400, 431, 355, 408, 409
See application file for complete search history.

(56) References Cited

U.S. PATENT DOCUMENTS

| | | | | |
|---|---|---|---|---|
| 4,745,593 A | * | 5/1988 | Stewart ................. | 370/244 |
| 5,095,480 A | * | 3/1992 | Fenner ................. | 370/238 |
| 5,323,394 A | | 6/1994 | Perlman | |
| 5,649,108 A | * | 7/1997 | Spiegel et al. ............ | 709/241 |
| 5,999,286 A | | 12/1999 | Venkatesan | |
| 6,023,733 A | | 2/2000 | Periasamy et al. .......... | 609/241 |
| 6,047,330 A | | 4/2000 | Stracke, Jr. ............... | 709/238 |
| 6,147,971 A | | 11/2000 | Rochberger et al. ........ | 370/238 |
| 6,201,794 B1 | | 3/2001 | Stewart et al. ............. | 370/248 |
| 6,690,648 B2 | * | 2/2004 | Niida et al. ................ | 370/236 |

OTHER PUBLICATIONS

"Distributed Route Selection for Establishing Real-Time Channels" by Kang G. Shin et al., IEEE Transactions on Parallel and Distributed Systems, vol. 11, No. 3, Mar. 2000.

\* cited by examiner

*Primary Examiner*—Chi Pham
*Assistant Examiner*—Christopher Grey

(57) ABSTRACT

A process for discovering a path from a source node to a destination node through a network by using "collisions" of randomly-propagating "feeler" packets originating from both the source node and the destination node. A discovered path is reported to the source node by the collision-detecting node where it may be stored and updated responsively to reports of new feeler packet collisions. Paths discovered and reported may be analyzed at either the collision-detecting node or the originating node to remove loops. The random collision-detecting path-discovery procedure reduces the operational traffic overhead associated with other exponentially-proliferating discovery methods. The feeler packets are propagated randomly through the network topology, thereby imposing relatively uniform path-discovery traffic effects in the network. Path discoveries arising from feeler-packet collisions always reflect current network topology and traffic conditions. The origination rate of feeler packets may be adjusted responsively to changes in demand, cost or other parameters.

30 Claims, 6 Drawing Sheets

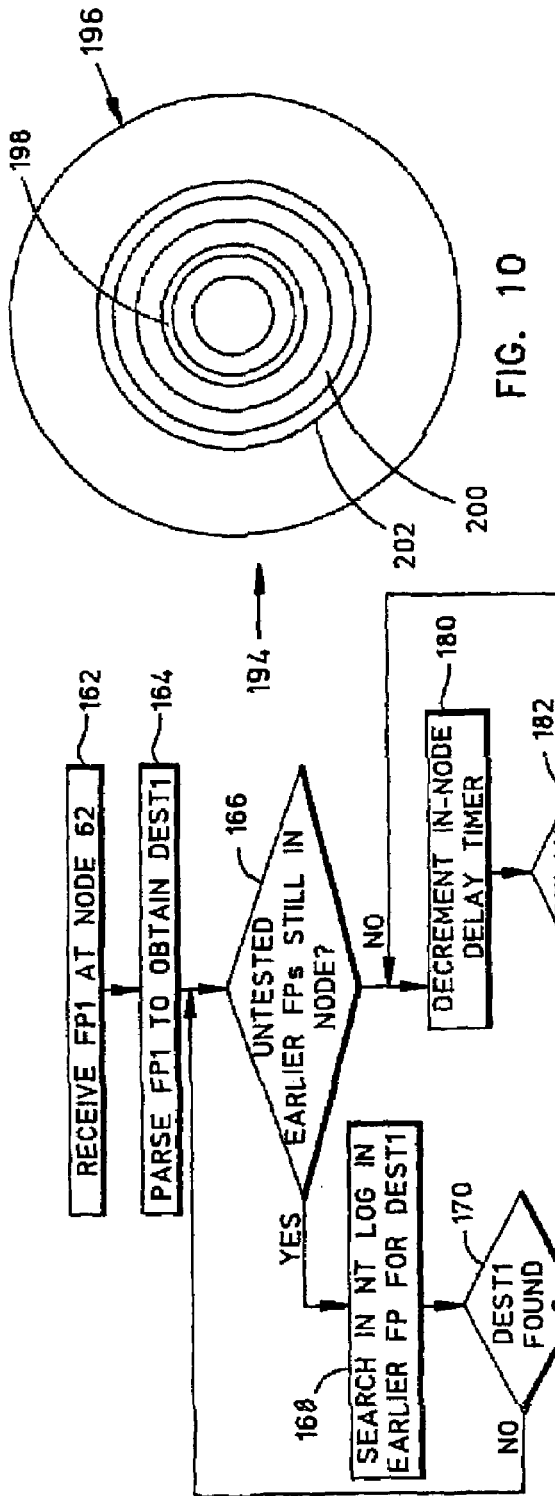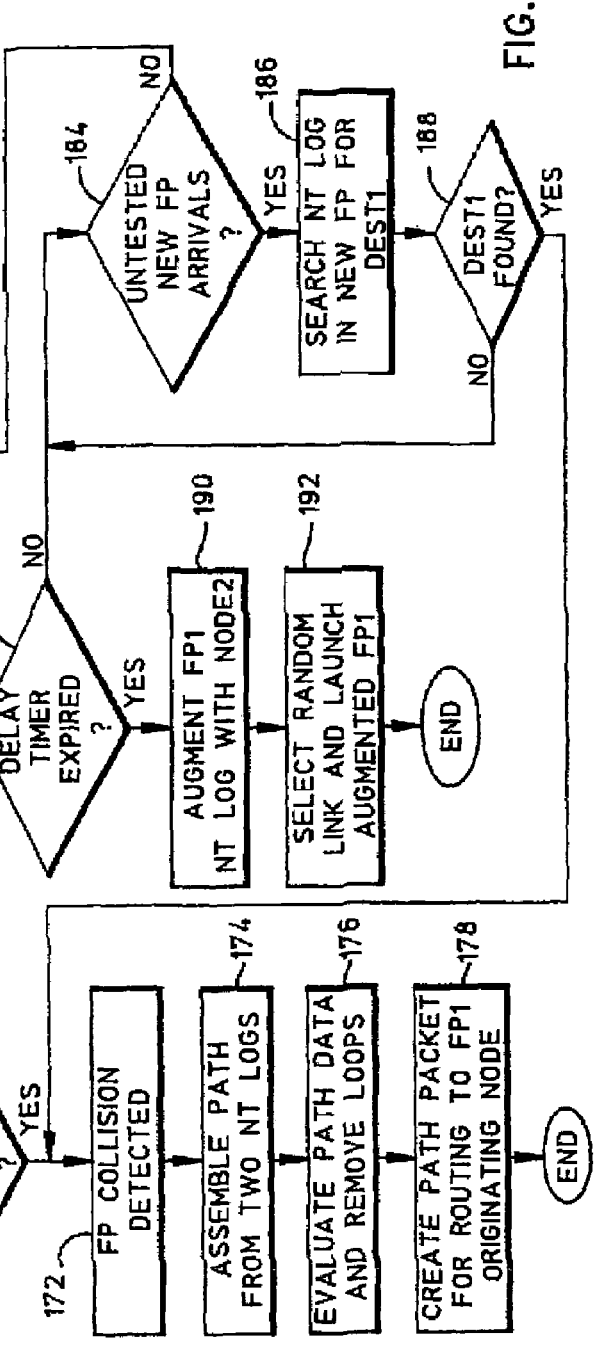
FIG. 9
FIG. 10

ADAPTIVE PATH DISCOVERY PROCESS FOR ROUTING DATA PACKETS IN A MULTINODE NETWORK

BACKGROUND OF THE INVENTION

1. Field of the Invention

This invention relates generally to data packet routing procedures in multinode networks and more particularly to an adaptive path discovery and reconfiguration procedure for distributed networks.

2. Description of the Related Art

A network includes a plurality of data packet switches (denominated "routers") interconnected with suitable technology such as point-to-point links, data packet repeaters (transparent bridges) or local area networks (LANs). The purpose of a network is to enable users who attach their equipment (denominated "endnodes") to the network to transmit data to and receive data from the other users' endnode equipment. As shown in FIG. 1, to the endnode 20, the network 22 is merely a large "cloud" to which it attaches, thereby enabling itself to communicate with other endnodes such as the endnodes 24 and 26 that are also attached to the cloud 22 over the plurality of links composing the network topology and exemplified by the links 28 and 30 that form part of the path 32 between endnode 20 (source) and endnode 26 (destination) in FIG. 1. Endnodes, bridges and routers are herein also generally denominated "nodes."

The Open Systems Interconnection (OSI) Reference Model defines seven network protocol layers. According to the OSI Reference Model, each layer within a node communicates with its peer layers in foreign nodes by exchanging protocol data units (PDUs) across the network. To effect such PDU transfers, each layer makes use of the services available from the lower layer in its node by exchanging service data units (SDUs) with its local adjacent layer.

The physical layer (layer 1) transmits bits of information across a link and deals with such problems as connector size and shape, assignment of connector pin functions, conversion of bits to electrical or optical signals, and bit-level synchronization. There may be several different types of physical layers within a network and even several different types of physical layers within a single node because each physical technology (e.g., CMOS, infrared, fiber optics, et al.) requires its own physical layer.

The data link layer (layer 2) transmits chunks of information across a link. Different links may implement different data link layers and a single node may support several data link layer protocols. The data link layer uses the services of the physical layer to transmit link PDUs (LP-DUs) to its peer data link layer in another node of the network. The "transparent bridge" operates in the data link layer.

The network layer (layer 3) enables any pair of nodes in a network to communicate with one another. A "fully connected" network is one in which every pair of nodes is connected by a direct link, but such a topology does not scale beyond a few nodes because of the exponential increase in link numbers. More typically, in a distributed multinode network, the network layer must find a path through a series of interconnected nodes, each of which must forward data packets in the appropriate direction. The network layer deals with such problems as path calculation, packet fragmentation and reassembly (to handle maximum packet size variation from link to link), and congestion control. The network layer uses the services of the data link layer to transmit network PDUs (NPDUs) to its peer network layer in another node of the network. The data packet switch (router) operates in the network layer.

When an endnode wants to send data to a remote node across the network, the sending endnode (source) must know the address of the destination node and must also know at least the first link in the path (route) from source to destination. Many routing strategies are known in the art but no one strategy is better than all others according to all measures of goodness. The "source routing" protocol is well known in the art. The basic idea behind source routing is that each packet header contains a path specification that was inserted into the packet by the source node itself. For the source node to have a path to the destination node available for insertion into a packet, it must first discover the path by some means. The source routing standard embraces many methods that can be used by a source node to establish and maintain paths. With strict source routing, the entire list of intermediate nodes is specified in a packet route list. With loose source routing, the packet route list may specify only a few intermediate addresses along the path that the packet must not miss visiting in a specified sequence during its journey through the network. The basic idea behind strict source routing is that a source endnode keeps a cache of routes for destination nodes with which it is currently having conversations. If no path for a particular destination is in the cache, the source node can employ a "path discovery" protocol to find a path or a set of paths. If a path in the cache is found to no longer work, the source can either attempt to find another new path or use one of the alternate routes it has stored for the destination.

In networks using bridges, the source node may discover a path by transmitting a special kind of data packet (an "explorer" packet) that replicates itself as it encounters branches or choices en route, eventually sending an explorer packet copy over each possible path in the network. Each explorer packet copy collects the diary of its travels so that a path can be selected from among the many explorer packet copies that reach the destination node and returned in a message to the source node. Whenever a source node discovers a path to another node, it caches the path so that it can be used for subsequent packets to the same destination. The problem of exponential explorer packet proliferation may be reduced by using the spanning tree explorer packet process known in the art. However, all source routing bridges must execute a spanning tree algorithm to support the spanning tree explorer packet process, which may be burdensome. As multiple explorer packets arrive at a destination node, one of the several available paths must be selected according to some strategy. Exemplary strategies include selecting the first packet received (on the theory that it travels on the fastest path); selecting the path that indicates maximum packet size; selecting the pathwith the fewest hops; selecting the most recently received path; or selecting some combination of the preceding.

Network layer routing protocols known in the art are based on either the "distance vector" or the "link state" distributed routing procedures. Distance vector routing requires that each node maintain the distance (a measure of transit cost) from itself to each possible destination. The distances making up a local distance vector are recursively computed within the local node by assembling and using the information from the distance vectors found at neighboring nodes. The chief problem with distance vector routing is the slow convergence of the distance vectors across the network. When routing information has only partially propagated through a network, routing performance can be seriously disrupted. Because a single link change may affect many paths, it is important for routing to recover as quickly as possible after a topological change in the network. Distance vector routing can take a very long time to converge after such a topological change. Practitioners have proposed numerous solutions to the slow convergence problem in distance vector routing, including the diff-using update algorithm (DUAL), the "split horizon" technique, the "fall path reporting" technique, the "poison reverse" technique, the "triggered-update" technique and various "hold-down" techniques. Unfortunately, none of these proposals has eliminated the basic disadvantages of the distance vector routing procedures. The primary advantage is that it requires less node memory than the link state routing procedures.

The link state routing procedure implements the basic idea that each router is responsible for meeting its neighbors and learning their names. Each router constructs a special packet (a link state packet or LSP) that contains a list of the names of and the cost (distance) to each of its adjacent neighbor nodes. The LSP is somehow transmitted to all other nodes and each node stores the most recently generated LSP from each and every other node in the network. Each node may then compute routes to any destination based on the complete map of the network topology derived from the accumulated LSP information. Link state routing is subject to many serious well-known problems such as "cancerous" LSP distribution and LSP incompatibility among nodes; conditions arising from ineffective transmission of a new LSP to all other nodes in the network when the local link states change. Other disadvantages known in the art include the drastic difficulties arising from time-stamp synchronization failure and sequence-number wrap-around. Moreover, either the link state routing or the distance vector routing procedure can be completely disabled by a single rogue router (denominated a "Byzantine" failure), although at least one link state routing protocol in the art has been proven to be immune to Byzantine failures (by Radia Perlman). Despite the large operational overhead, link state routing is preferred in the art mainly because of the faster network convergence on topology changes.

The art is replete with proposals for improving the path discovery and maintenance process in multinode networks. For example, Shin et al. [Kang G. Shin et al., "Distributed Route Selection for Establishing Real-Time Channels," *IEEE Trans. Parallel and Distributed Systems*, vol. 11, no. 2, pp. 318–335, Mar. 2000] propose an improved link state routing procedure that eases the centralized route selection bottleneck while improving efficiency by quickly pruning infeasible routes from the parallel route search. Shin et al. are primarily concerned with "completeness" (ensuring the discovery of a qualified route if one exists) and use a modified Bellman-Ford algorithm that is less efficient than the original, but neither consider nor suggest solutions to the problem of adaptively discovering a path between network endnodes in a dynamic network topology. Another proposal for improved link state routing efficiency in Private Network to Network Interface (PNNI) Based Asynchronous Transfer Mode (ATM) networks is the modified Dijkstra path optimization algorithm disclosed by Rochberger et al. in U.S. Pat. No. 6,147,971. The Dijkstra procedure is a link-state routing protocol that uses intensive node processing to minimize the "cost" of a path and the Rochberger et al. proposal improves the convergence time of the Dijkstra protocol for hop-count minimization only.

In U.S. Pat. No. 6,047,330, Stracke, Jr., proposes a virtual router discovery system for building a multicast virtual network over an existing topology and for dynamically adapting the routing system responsively to unpredicted changes in underlying network connectivity. Stracke, Jr., use virtual routers that send out "heartbeats" across the Internet Protocol (IP) network, each marked with a Time To Live (TTL) value. Each router returns a response packet upon receiving the heartbeat packet and the originating router obtains an estimate of the distance (cost) to the responding router upon receipt of the response packet. By selecting closer routers with which to connect, the system automatically and dynamically adapts to network changes by dropping inefficient connections in favor of more efficient ones. But Stracke, Jr., neither considers nor suggests solutions to the problem of discovering a path between network endnodes in a dynamic network topology.

In U.S. Pat. No. 6,023,733, Periasamy et al. disclose an efficient method for representing a link state table in a node, thereby permitting storage of a representation of the entire network at each node with less memory demand. But they neither consider nor suggest solutions to the dynamic path discovery problem.

In U.S. Pat. No. 6,201,794, Stewart et al. disclose a dynamic path discovery technique intended to determine the most efficient path for transmitting a message from a source node to many other destination nodes considering prevailing network traffic conditions. Pilot messages are transmitted between communicating nodes either periodically or continuously to monitor the "cost" of each available path. The various paths traversed by pilot messages are returned to the originating node and stored for use in selecting the most efficient (least cost) path. A master riding node can alter pilot message sequencing responsively to network traffic conditions to more frequently update path analysis over busy routes. Disadvantageously, this technique tends to increase network message traffic over the busier routes.

There still exists a well-known need for a path selection system which can dynamically adapt to changes in network connectivity and traffic conditions without adding significantly to network traffic congestion and node operational overhead. The related unresolved problems and deficiencies are clearly felt in the art and are solved by this invention in the manner described below.

SUMMARY OF THE INVENTION

This invention solves the dynamic path discovery problem by relying on the "collisions" of randomly-propagating "feeler" packets from both the source node and the destination node to discover a path connection the source and destination nodes across a multinode network. The discovered paths may be stored at the source node and updated in response to reports of new feeler packet collisions. Paths discovered in accordance with this invention may be analyzed at the source node to remove loops.

It is a purpose of this invention to discover a valid path from source to destination node with reduced operational traffic overhead effects. It is a feature of the method of this invention that the feeler packets are propagated randomly through the network topology, thereby imposing relatively uniform traffic effects in the network. It is an advantage of the method of this invention that the path discoveries always reflect current network topology and traffic conditions at the time they are returned to the source node. It is another feature of the method of this invention that the rate of generation of feeler packets may be adjusted by the communicating nodes in response to changes in demand, cost or other parameters.

In one aspect, the invention is a machine-implemented process for discovering a path for transferring at least one data packet from a source node to a destination node through a plurality of nodes linked together to form a network, the procedure including the steps of sending, from the source node to at least a first one of the plurality of network nodes, a feeler packet including feeler data identifying the destination node and node transit log data identifying the source node, sending, from the destination node to at least a second one of the plurality of network nodes, a feeler packet including node transit log data identifying the destination node and, in response to the receipt of a first feeler packet at a first of the plurality of network nodes, augmenting the node transit log in the first received feeler packet with data identifying the first receiving node to form an augmented first feeler packet, identifying in the first receiving node a second received feeler packet having node transit log data identifying the destination node, and combining the node transit log data from the first and second received feeler packets to represent a path discovered for transferring at least one data packet from the source node to the destination node through the network when the second received feeler packet is found, otherwise sending a copy of the augmented first feeler packet to a second of the plurality of network nodes.

In another aspect, the invention is a network apparatus for discovering a path for transferring at least one data packet from a source node to a destination node through a plurality of nodes linked together to form a network, including means for sending, from the source node to at least a first one of the plurality of network nodes, a feeler packet including feeler data identifying the destination node and node transit log data identifying the source node, means for sending, from the destination node to at least a second one of the plurality of network nodes, a feeler packet including node transit log data identifying the destination node, means for augmenting the node transit log in a first received feeler packet with data identifying a first receiving node to form an augmented first feeler packet in response to the receipt of the first feeler packet at the first receiving node, means for sending a copy of the augmented feeler packet from the first receiving node to a second of the plurality of network nodes, means for identifying, in the first receiving node, a second received feeler packet having node transit log data identifying the destination node, and means, in response to finding the second received feeler packet at the first receiving node, for combining the node transit log data from the first and second received feeler packets to represent a path discovered for transferring at least one data packet from the source node to the destination node through the network.

In yet another aspect, the invention is a computer program product for use in a system for discovering a path for transferring one or more data packets from a source node to a destination node through a plurality of nodes linked together to form a network, including a recording medium, means recorded on the recording medium for directing the system to send, from the source node to at least a first one of the plurality of network nodes, a feeler packet including feeler data identifying the destination node and node transit log data identifying the source node, means recorded on the recording medium for directing the system to send, from the destination node to at least a second one of the plurality of network nodes, a feeler packet including node transit log data identifying the destination node, means recorded on the recording medium for directing the system to augment, in response to the receipt of a first feeler packet at a first receiving node, the node transit log in the first received feeler packet with data identifying the first receiving node to form an augmented first feeler packet, means recorded on the recording medium for directing the system to send a copy of the augmented feeler packet from the first receiving node to a second of the plurality of network nodes, means recorded on the recording medium for directing the system to identify in the first receiving node a second received feeler packet having node transit log data identifying the destination node, and means recorded on the recording medium for directing the system to combine, in response to finding the second received feeler packet at the first receiving node, the node transit log data from the first and second received feeler packets to represent a path discovered for transferring at least one data packet from the source node to the destination node through the network.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 9 is a block diagram of a flow chart illustrating the path discovery procedure of this invention at a collision-detection node; and FIG. 10 is a schematic diagram illustrating an exemplary CDROM embodiment of the computer program product of this invention.

DESCRIPTION OF THE PREFERRED EMBODIMENT

Figure 1:
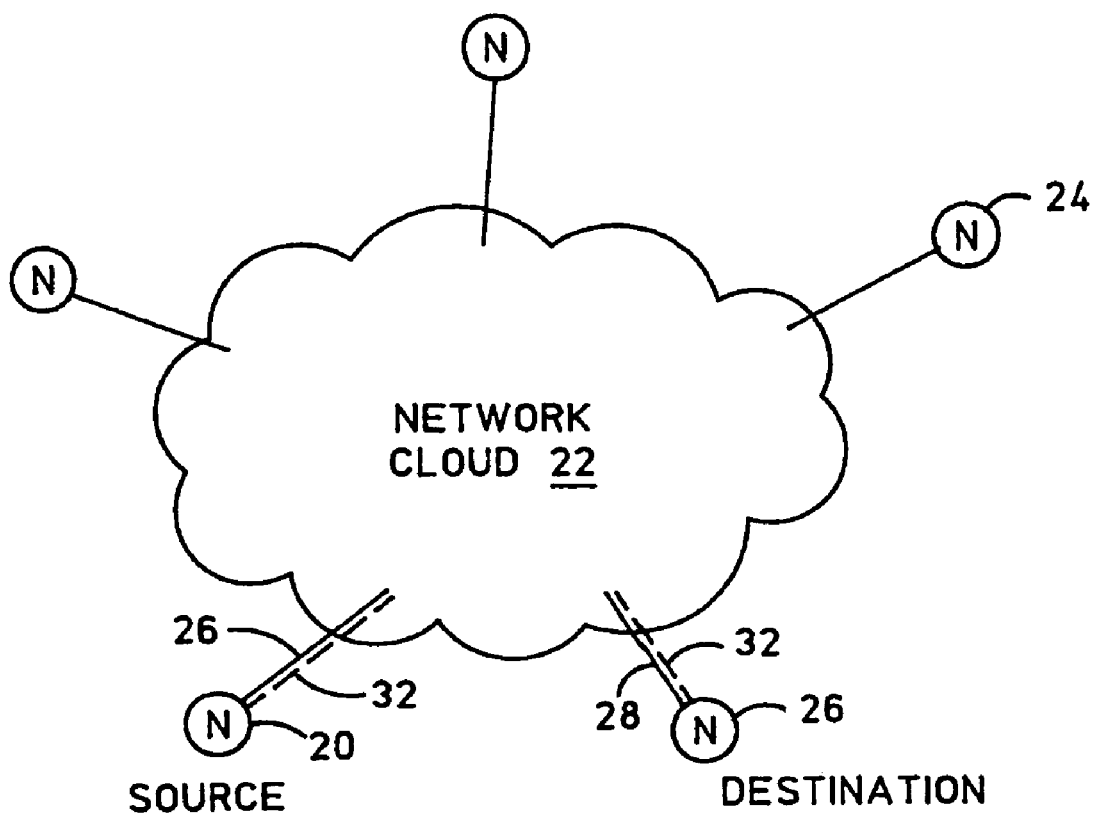
FIG. 1 is a schematic diagram showing several endnodes interconnected by a multinode network.
Figure 2:
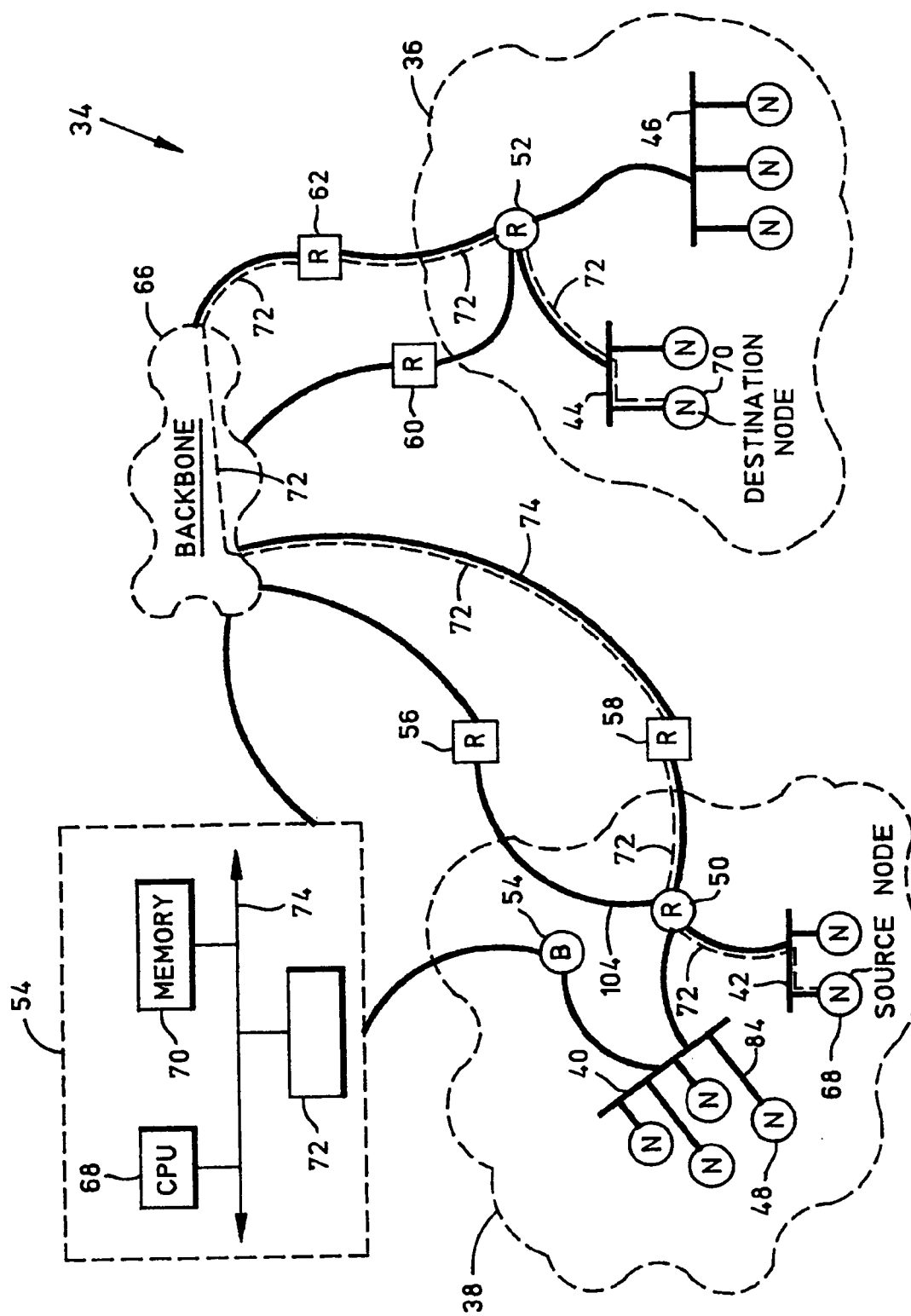
FIG. 2 is a schematic diagram illustrating an exemplary internetwork connecting a backbone and several domains each having one or more local area networks interconnecting a plurality of endnodes.

FIG. 2 is a block diagram of an exemplary embodiment of a network 34 implementing the path discovery system of this invention. Network 34 is hierarchically organized to embrace a collection of domains exemplified by the domains 36–38, each containing a number of local computer networks (LCNs) exemplified by the LCNs 40, 42, 44 and 46, each having one or more endnodes exemplified by the endnode 48. As used herein, LCNs may be, for example, local area networks (LANs), metropolitan area networks (MANs), wide area networks (WANs), etc. The endnodes are, typically, computers (workstations and servers) but may be any type of device that can include a network interface card (NIC), such as a printer or modem. LCNs 40–46 are connected by intermediate nodes, such as the intradomain routers 50, 52, and 54 and the interdomain routers 56, 58, 60, 62 and 64. The backbone 66 is the highest hierarchical level in network 34 and consists of a large plurality of interlinked nodes (not shown), including other interdomain routers (not shown), providing many redundant paths between domains 36–38 and many other domains (not shown). A LCN is depicted in FIG. 2 as a line to which an endnode can be attached to signify that it can transmit data packets to, and receive data packets from, every other endnode attached to that same line. More than one interdomain router may be used to connect a domain to the backbone, which is often encouraged for path redundancy.

The routers exemplified by router 54 typically include a central processing unit (CPU) 68, a memory unit 70 and a data storage device 72 interconnected by a system bus 74. Memory unit 70 may include random access memory (RAM) devices (not shown) that are addressable by CPU 68 and may store program instructions as well as data. An operating system, portions of which are typically resident in memory and executed by the CPU 68, functionally organizes the node by, among other things, invoking network operations in support of processes executing in the CPU.

Until now, intradomain routers 50, and 54 were required to manage communications among LCNs 40 and 42 within domain 38 and communicate with each other using an intradomain routing protocol, such as the distance vector routing information protocol (RIP) or the link state intermediate system to intermediate system protocol (IS—IS) known in the art. Similarly, interdomain routers 56, 58, 60, 62 and 64 connecting domains 36 and 38 to backbone 66 were required to communicate with each other using an interdomain routing protocol, such as the interdomain routing protocol (IDRP) for confederations, the exterior gateway protocol (EGP) or the border gateway protocol (BGP) known in the art. However, communication in network 34 may also be managed in accordance with the path discovery and source routing methods of this invention. For example, data packets may be routed from a source node 68 though network 34 to a destination node 70 according to this invention by first discovering the path 72 comprising a plurality of internodal links, exemplified by the link 74, and then including the discovered path data in the Routing Information (RI) field of each data packet (FIG. 7) sent from source node 68 to destination node 70 in the manner described below.

Figure 3:
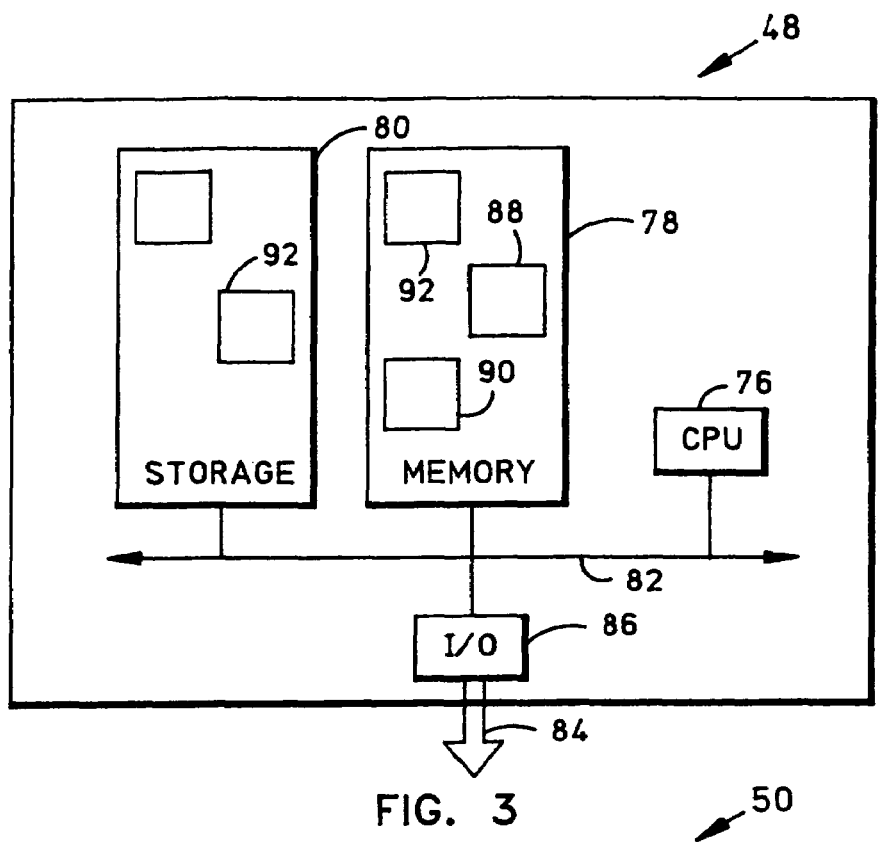
FIG. 3 is a block diagram illustrating the functional embodiment of a typical endnode from FIG. 1 or 2.

FIG. 3 shows a block diagram illustrating an exemplary embodiment of endnode 48 from FIG. 2, which includes a central processing unit (CPU) 76, a random access memory 78 and a data storage device 80 connected to one another by a local data bus 82 in the usual manner for a general purpose computer. Endnode 48 communicates with network 34 (FIG. 2) by means of the link 84 (FIG. 2, 3) that is coupled to local data bus 82 by means of the input/output (I/O) circuit 86. Endnode 48 operates generally by executing in CPU 76 a plurality of software instructions that are stored in memory 78 and/or in storage 80. For example, the source node feeler packet processing steps of the path discovery procedures of this invention may be stored in memory 78 as the binary software modules 88 and 90 and a path discovered to the destination node may be stored in memory 78 and in storage 80 as the data structure 92.

Figure 4:
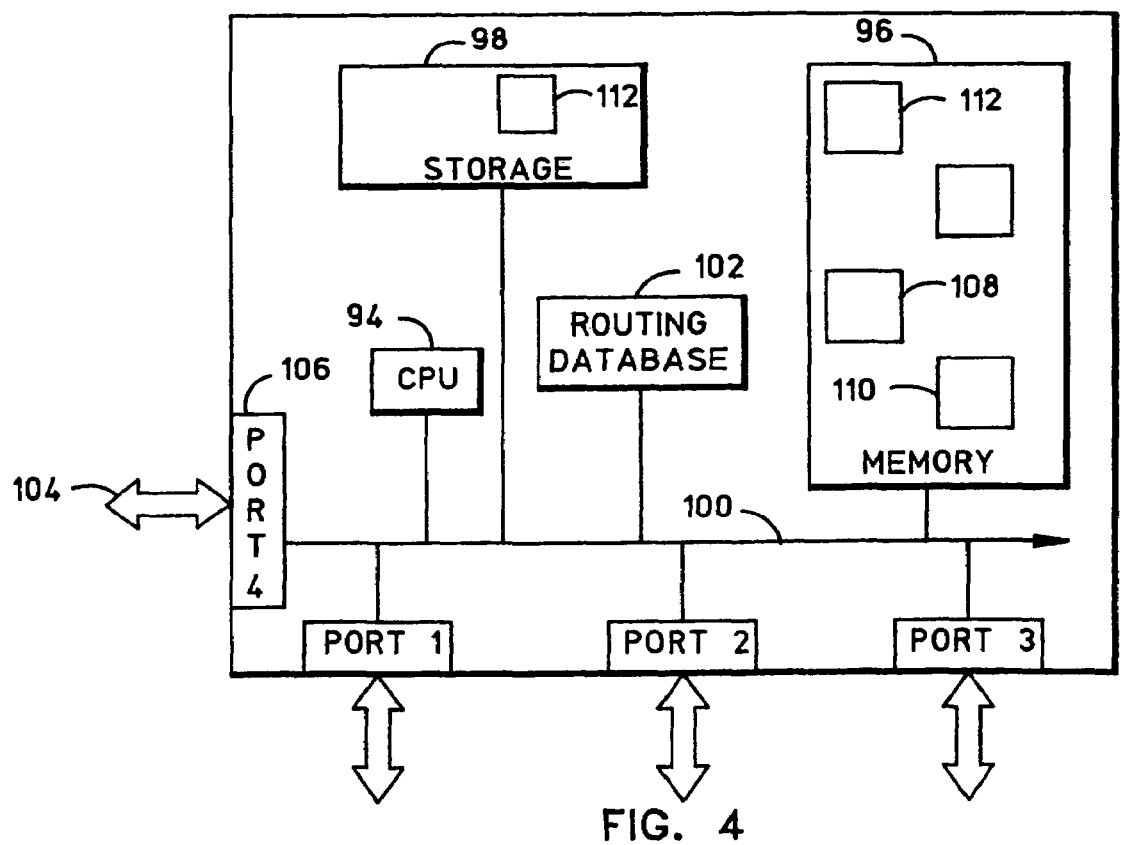
FIG. 4 is a block diagram illustrating the functional embodiment of a typical intermediate node (router) from FIG. 2.

FIG. 4 shows a block diagram illustrating an exemplary embodiment of router node 50 from FIG. 2, which includes a central processing unit (CPU) 94, a random access memory 96 and a data storage device 98 connected to one another by a local data bus 100 in the usual manner for a general purpose computer. Router node 50 may also include a separate routing database 102 that specifies the identity of its immediate neighboring nodes, for example. Router node 50 communicates with network 34 (FIG. 2) by means of the plurality of links exemplified by the link 104 (FIGS. 2, 3) that is coupled to local data bus 100 by means of the input/output (I/O) port 106. Router node 50 operates generally by executing in CPU 94 a plurality of software instructions that are stored in memory 96 and/or in storage 98 or other memory means like database 102. For example, the feeler packet collision processing steps of the path discovery procedures of this invention may be stored in memory 96 as the binary software modules 108 and 110 and a transient feeler packet may be stored in memory 96 and in storage 98 as the data structure 112

Figure 5:
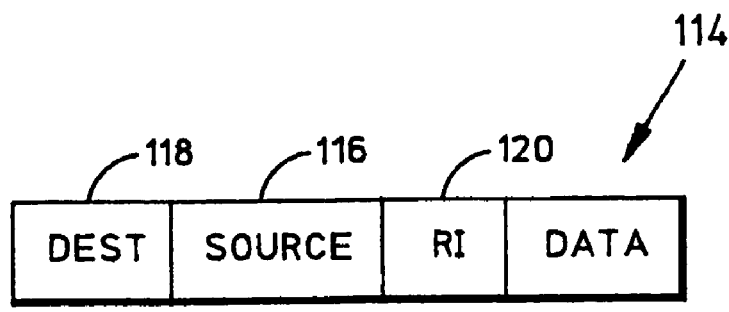
FIG. 5 is a schematic illustration of an exemplary source-routed data packet suitable for use in the link layer (layer 2)

FIG. 5 is a schematic illustration of an exemplary source-routed data packet 114 suitable for use for communicating between, for example, nodes 68 and 70 in the link layer (layer 2) of network 34. Data packet 114 includes a plurality of data fields including a source (or origin) field 116 containing data specifying the identity/address of the node which originated data packet 114. In data packets originating at node 68, source field 116 includes the identity/address of node 68. The destination field 118 contains data specifying the identity/address of the node to which node 68 wants to send data packet 114. In data packets originating at node 68 and intended to arrive at node 70, destination field 118 includes the identity/address of node 70. Because this is a "source-routed" data packet, data packet 114 also includes a routing information (RI) field 120 containing a complete specification of the path over which data packet 114 must travel before arriving at destination node 70. Accordingly, the complete path specification must be discovered and stored at source node 68 before data packet 114 can be created. In accordance with this invention, source node 68 obtains the path to destination node 70 by receiving a path data packet (PP) (FIG. 7) from a "collision" node in network 34 after launching one or more feeler data packets (FPs) (FIG. 6).

Figure 6:
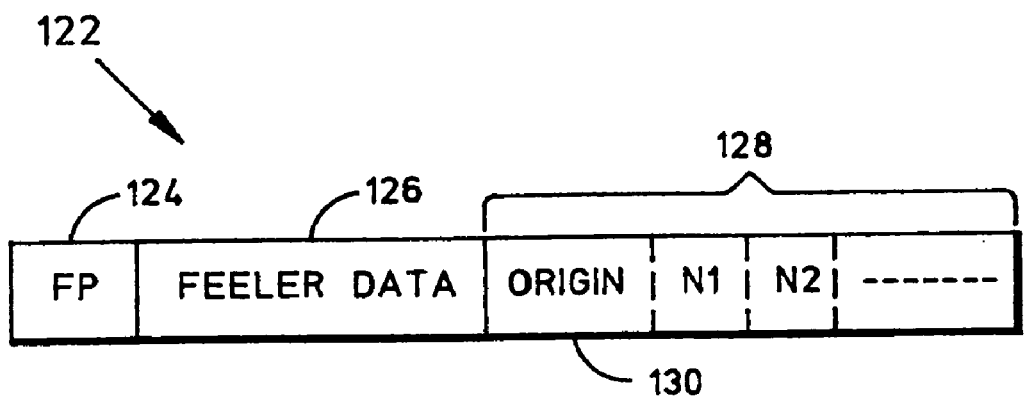
FIG. 6 is a schematic illustration of an exemplary randomly-routed feeler packet according to this invention.
Figure 8:
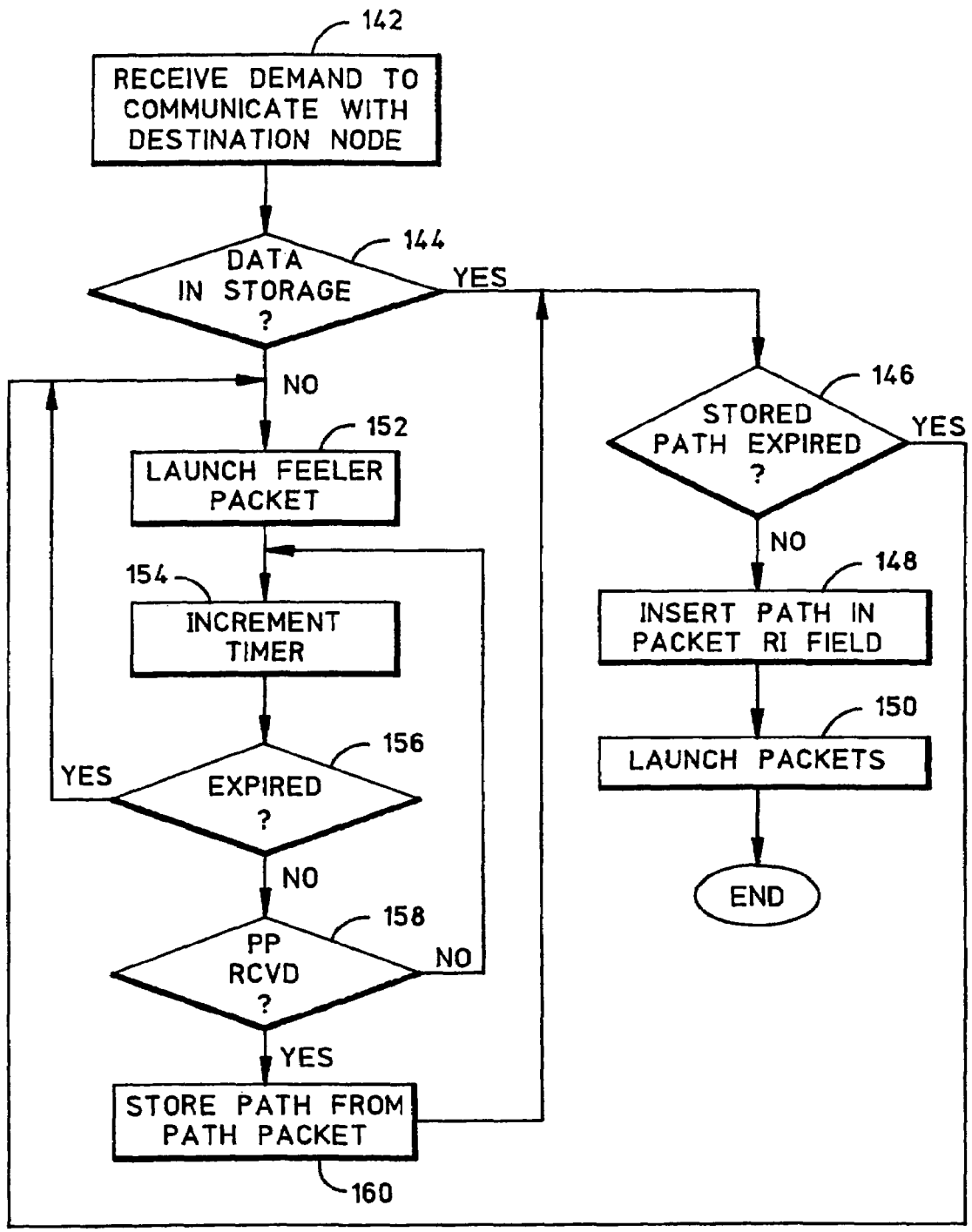
FIG. 8 is a block diagram of a flow chart illustrating the path discovery procedure of this invention at a source node.

FIG. 6 is a schematic illustration of an exemplary randomly-routed feeler data packet (FP) 122 created in a source node according to the method of this invention (FIG. 8). FP 122 includes a FP data field 124 that identifies FP 122 as a "feeler data packet" and a feeler data field 126 that contains all information needed to specify the discovery of a path, such as the identity/address of the desired destination node, a timestamp of origin, hop count limits, and any other necessary data specified by the originating node. Finally, FP 122 includes a node transit (NT) log field 128, which is incrementally updated from node to node by adding the identity/address of each node visited during transit from the originating node to a "collision" with another FP from the desired destination node. Thus, when FP 122 is created in the originating node; for example, in source node 68 (FIG. 2); NT Log 128 includes only a single entry 130 specifying the identity/address of source node 68. FP 122 is then launched randomly to a neighboring node, where it is received and processed according to the method of this invention (FIG. 9).

Figure 7:
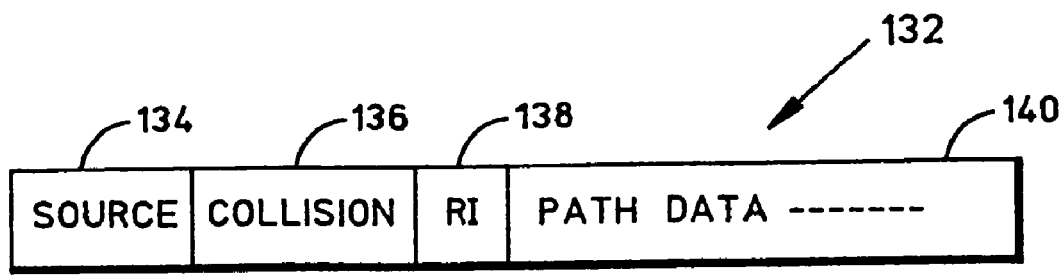
FIG. 7 is a schematic illustration of an exemplary collision-routed path-data packet according to this invention.

FIG. 7 is a schematic illustration of an exemplary collision-routed path-data packet (PP) 132 according to this invention. When FP 122 "collides" with a second FP (not shown) that either originated or had passed through the desired destination node, the node detecting such collision (the collision node) then creates and sends PP 132 back to the source node, as is more fully described below in connection with FIGS. 8–9. PP 132 may but need not include a PP data field (not shown) that identifies PP 122 as a "path data packet" because PP 122 can be configured using only the destination, source, routing information and data fields of the simple source-routed data packet 114 (FIG. 5). The destination data field 134 specifies the identity/address of the "source" node that originated FP 122. The source data field 136 specifies the identity/address of the "collision" node in which FP 122 collided with the second FP (not shown), which is also the originating node from which PP 132 is sent. The RI field 138 specifies the path from the collision node back to the source node, which can be obtained by reversing the entries in NT Log 128 of FP 122. Finally, the data field 140 includes the path information gleaned from the collision of FP 122 with the second FP (not shown) in a manner illustrated by the following example:

Referring again to path 72 in FIG. 2, consider that a first FP from source node 68 collides with a second FP from destination node 70 at the collision node 62. The first FP was created in node 68 responsively to a desire by node 68 to communicate with node 70, so the contents of the fields in the first FP are (the transit through backbone 66 is shown as "N1*2*3"):

FP field is FP
Feeler data field is "desired destination=NODE 70"
Node Transit Log Field is "NODE 68" "NODE 50" "NODE 58" "N1*2*3"

The second FP may have been created by node 70 responsively to a desire by node 70 to communicate with a third node; node 48, for example, so the contents of the fields in the second FP are:

FP field is FP
Feeler data field is "desired destination=NODE 48"
Node Transit Log Field is "NODE 70" "NODE 52"

When the first FP arrives at node 62, node 62 is searched for other FPs and the second FP is discovered. When the second FP is examined, the "NODE 70" entry in the RI field is found to match with the "NODE 70 entry in the feeler data field of the first FP; node 62 thereby detects a "collision" between first and second FPs and proceeds to construct a PP for transmission to node 70. The field contents of this PP are:

Source field is "NODE 68"
Collision field is "NODE 62"
RI field is "N3*2*1" "NODE 58" "NODE 50" "NODE 68"
Data field (discovered path) is "NODE 68" "NODE 50" "NODE 58" "N1*2*3" "NODE 62" "NODE 52" "NODE 70"

Because a collision was detected for the first FP, the first FP is not sent on and expires in node 62. In contrast, in this example, when the second FP first arrived at node 62, the NT Logs of all other FPs present at node 62 failed to exhibit the presence of the desired destination "NODE 48." A collision for the second FP having not been detected at node 62, the second FP is then augmented by adding "NODE 62" to the NP Log and sent on randomly to some adjacent node other than the originating node 52 from which it was received.

FIG. 8 is a flow chart illustrating an exemplary embodiment of a portion of the procedure of this invention suitable for performance at a source node such as, for example, source node 68 (FIG. 2). This procedure initiates at the step 142 responsively to a demand in source node 68 to communicate with destination node 70 (for example). In the step 144, node 68 first determines if a path to node 70 is available locally. If it is locally stored, it is tested in the step 146 for currency and, if it is not expired, node 68 inserts the path into the RI field of each data packet intended for node 70 at the step 148 and launches the packets on their way through network 34 at step 150. If the locally stored path to node 70 is expired or otherwise unavailable, node 68 starts a path discovery procedure at the step 152 by creating and launching a feeler packet intended to elicit a path to node 70. In the steps 154 and 156, a timer is counted down while awaiting the return of a PP from some collision node in network 34 at step 158. If the timer expires, step 152 is repeated by launching another feeler packet intended to elicit a path to node 70 and steps 154 and 156 again cycled while awaiting a PP at step 158. When a PP arrives in step 158, the path data are stored locally in node 58 at the step 160 and the procedure returns to steps 146, 148 and 150 described above. Of course, it may be readily appreciated that the FP launching step 152 may also be repeated responsively to many suitable conditions other than a measure of data currency, such as, for example, in response to a measure of the demand at node 68 for a path to node 70, or in response to a measure of the cost of the path represented by the stored path data at node 68.

FIG. 9 is a flow chart illustrating an exemplary embodiment of the portion the path discovery procedure of this invention suitable for performance at a collision-detection node such as, for example, node 62 (FIG. 2). This procedure initiates at the step 162 responsively to the receipt of a first feeler packet (FP1) at node 62. In step 164, FP1 is parsed to obtain the desired destination (DEST1), which is then sought within node 62 by examining every other FP present in node 62, which may, for example, include all unexpired FPs that arrived before FP1 and all FPs that arrive during the tenancy (before expiration) of FP1 at node 62. In the step 166, the existence of earlier FP arrivals is tested and, at the step 168, the NT Log for each FP found is examined for the presence of DEST1. If step 170 finds DEST1 in the NT Log of an earlier-arrived FP, the next step 172 declares a collision detection for FP1. FP1 is then allowed to remain in node 62 until it expires, whereupon it is deleted without forwarding. At the step 174, the path data are assembled from the NT Logs of the colliding FPs to form the path to node 70 sought by node 68. In the step 176, which may instead be performed in node 68 after receiving the path data from node 62, any loops are removed from the path data, which may be accomplished in principle merely by deleting NT Log entries between any two identical entries and merging the identical entries. Finally, in the step 178, a PP is created and sent to node 68 containing the path data gleaned from the FP collision at node 62. In an alternative embodiment (not shown) for systems unconcerned about packet traffic, the PP (suitably modified by, for example, reversing the path data field sequence) may also be sent forward to node 70 for immediate use in launching packets back to node 68. Of course, the data packet RI field can be extracted at node 70 for the same purpose (with less network packet traffic) once the first data packet (FIG. 5) arrives at node 70 from node 68 responsive to the arrival of the PP sent to node 68.

When step 166 completes without detecting a collision for FP1 at node 62, the procedure continues to the step 180, which decrements a "time in node" timer for FP1. Step 182 tests the timer for expiration and, unless expired, the step 184 tests node 62 for a newly arrived FP, the NT Log of which is examined at the step 186 for a DEST1 entry. If DEST1 is found at step 188, the procedure branches to step 172 discussed above and FP1 is allowed to expire in node 62. If step 188 fails, step 184 is again executed and, if step 184 fails, the timer decrementing loop is restarted at step 180. When time has run out for FP1 in node 62 without collision, FP1 is augmented at the step 190 by adding "NODE 62" to the FP1 NT Log. Finally, in the step 192, a random outgoing link from node 62 is selected and a copy of the augmented FP1 is sent to the adjacent node on the selected link, where the procedure in FIG. 9 may be repeated.

FIG. 10 is a schematic diagram of a CDROM 194, which is an exemplary embodiment of the computer program product of this invention. CDROM 194 includes a recording medium 196 in which are stored a plurality of software means exemplified by the software program modules 198, 200 and 202. Modules 198, 200 and 202 may, for example, include means for directing node 68 to augment FP1 according to step 190 (FIG. 9) or means for directing node 68 to combine the NT Log contents from two colliding FPs, for example. Such program modules may be transferred from CDROM 194 to the memory elements of any node or nodes in network 34 to accomplish the process of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A machine-implemented process for discovering a path for transferring at least one data packet from a source node to a destination node through a plurality of nodes linked together to form a network, the procedure comprising the unordered steps of:
   (a) sending, from the source node to a first randomly-selected one of the plurality of network nodes, a first feeler packet including first feeler data identifying the destination node and node transit log data identifying the source node;
   (b) independently from the first sending step (a), sending, from the destination node a second randomly-selected one of the plurality of network nodes, a second feeler packet including second feeler data identifying a network node and node transit log data identifying the destination node; and
   (c) in response to the receipt at a first receiving node of a first received feeler packet having node transit log data identifying the source node;
      (c.1) augmenting the node transit log in the first received feeler packet with data identifying the first receiving node to form an augmented first received feeler packet,
      (c.2) seeking, in the first receiving node, a record of a second received feeler packet having node transit log data identifying the destination node, and
         (c.2.1) if the second received feeler packet is found, combining the node transit log data from the first and second received feeler packets to represent a path discovered for transferring at least one data packet from the source node to the destination node through the network, otherwise
         (c.2.2) sending a copy of the augmented first received feeler packet to a second randomly-selected receiving node.

2. The process of claim 1 further comprising the step of:
   (d) sending, to the source node, a copy of the combined node transit log data representing the discovered path.

3. The process of claim 2 further comprising the steps of:
   (e) storing data representing the discovered path at the source node; and
   (f) repeating the feeler packet sending step (a) in response to a measure of the age of the stored path data.

4. The process of claim 2 further comprising the steps of:
   (e) storing data representing the discovered path at the source node; and
   (f) repeating the feeler packet sending step (a) in response to a measure of the demand at the source node for a path to the destination node.

5. The process of claim 2 further comprising the steps of:
   (e) storing data representing the discovered path at the source node; and
   (f) repeating the feeler packet sending step (a) in response to a measure of the cost of the path represented by the stored path data.

6. The process of claim 1 wherein the identifying step (c.2) comprises the step of:
   seeking, in the first receiving node, a record of a second received feeler packet having node transit log data identifying the destination node as the second received feeler packet originating node.

7. The process of claim 6 further comprising the steps of:
   (d) sending, to the source node, a copy of the combined the node transit log data representing the discovered path;
   (e) storing data representing the discovered path at the source node; and
   (f) repeating the feeler packet sending step (a) in response to the age of the stored path data.

8. The process of claim 6 further comprising the steps of:
   (d) sending, to the source node, a copy of the combined the node transit log data representing the discovered path;
   (e) storing data representing the discovered path at the source node; and
   (f) repeating the feeler packet sending step (a) in response to a measure of the demand at the source node for a path to the destination node.

9. The process of claim 6 further comprising the steps of:
   (d) sending, to the source node, a copy of the combined the node transit log data representing the discovered path;
   (e) storing data representing the discovered path at the source node; and
   (f) repeating the feeler packet sending step (a) in response to a measure of the cost of the path represented by the stored path data.

10. The process of claim 1 wherein the combining step (c.2.1) further comprises the step of:
    (c.2.1.1) revising the node transit log data from the first and second received feeler packets to eliminate loops from the discovered path.

11. A network apparatus for discovering a path for transferring at least one data packet (114) from a source node (68) to a destination node (70) through a plurality of nodes (50, 52, 58, 62) linked together to form a network (34), the apparatus comprising:
    means (76, 78, 80, 86) for sending, from the source node (68) to a first randomly-selected one (50) of the plurality of network nodes, a first feeler packet (122) including first feeler data (126) identifying the destination node (70) and node transit log data (128) identifying the source node (68);
    means (76, 78, 80, 86) for sending, from the destination node (70) to a second randomly-selected one (52) of the plurality of network nodes, a second feeler packet (122) including second feeler data (126) identifying a network node (52) and node transit log data (128) identifying the destination node (70), independently of the first feeler packet;

means (94, 96, 98), responsive to the receipt at a first receiving node (50) of a first received feeler packet (122) having node transit log data identifying the source node, for augmenting the node transit log (128) in the first received feeler packet (122) with data identifying the first receiving node (50) to form an augmented first received feeler packet (122);

means (94, 96, 98, 102) for sending a copy of the augmented feeler packet (122) from the first receiving node (50) to a second randomly-selected receiving node (58);

means (94, 96, 98) for seeking, in the first receiving node (50), a record of a second received feeler packet (122) having node transit log data (130) identifying the destination node (70); and means (94, 96, 98), responsive to finding the second received feeler packet (122) at the first receiving node (50), for combining the node transit log data from the first and second received feeler packets to represent a path (72) discovered for transferring at least one data packet (114) from the source node (68) to the destination node (70) through the network (34).

12. The apparatus of claim 11 further comprising:
means (94, 96, 98, 132) for sending, to the source node (68), a copy of the combined node transit log data (140) representing the discovered path (72).

13. The apparatus of claim 12 further comprising:
means (78, 80) for storing data (140) representing the discovered path (72) at the source node (68); and
means (76, 78, 80, 86) for re-sending the first feeler packet (122) from the source node (68) in response to a measure of the age of the stored path data (92).

14. The apparatus of claim 12 further comprising:
means (78, 80) for storing data (140) representing the discovered path (72) at the source node (68); and
means (76, 78, 80, 86) for re-sending the first feeler packet (122) from the source node (68) in response to a measure of the demand at the source node (68) for a path to the destination node (70).

15. The apparatus of claim 12 further comprising:
means (78, 80) for storing data (140) representing the discovered path (72) at the source node (68); and
means (76, 78, 80, 86) for re-sending the first feeler packet (122) from the source node (68) in response to a measure of the cost of the path (72) represented by the stored path data (92).

16. The apparatus of claim 11 further comprising:
means (94, 96, 98) for seeking, in the first receiving node (50), a record of a second received feeler packet (122) having node transit log data (140) identifying the destination node (70) as the second received feeler packet originating node (130).

17. The apparatus of claim 16 further comprising:
means (94, 96, 98, 132) for sending, to the source node (68), a copy of the combined the node transit log data (140) representing the discovered path (72);
means (78, 80) for storing data (140) representing the discovered path (72) at the source node (68); and
means (76, 78, 80, 86) for re-sending the first feeler packet (122) from the source node (68) in response to a measure of the age of the stored path data (92).

18. The apparatus of claim 16 further comprising:
means (94, 96, 98, 132) for sending, to the source node (68), a copy of the combined the node transit log data (140) representing the discovered path (72);
means (78, 80) for storing data (140) representing the discovered path (72) at the source node (68); and
means (76, 78, 80, 86) for re-sending the first feeler packet (122) from the source node (68) in response to a measure of the demand at the source node (68) for a path to the destination node (70).

19. The apparatus of claim 16 further comprising:
means (94, 96, 98, 132) for sending, to the source node (68), a copy of the combined the node transit log data (140) representing the discovered path (72);
means (78, 80) for storing data (140) representing the discovered path (72) at the source node (68); and
means (76, 78, 80, 86) for re-sending the first feeler packet (122) from the source node (68) in response to a measure of the cost of the path (72) represented by the stored path data (92).

20. The apparatus of claim 11 further comprising:
means (94, 96, 98) for revising the combined node transit log data (140) from the first and second received feeler packets to eliminate loops from the discovered path (72).

21. A computer program product for use in a system for discovering a path for transferring one or more data packets from a source node to a destination node through a plurality of nodes linked together to form a network, the computer program product comprising:
a recording medium;
means recorded on the recording medium for directing the system to send, from the source node to a first randomly-selected one of the plurality of network nodes, a first feeler packet including first feeler data identifying the destination node and node transit log data identifying the source node;
means recorded on the recording medium for directing the system to send, from the destination node to a second randomly-selected one of the plurality of network nodes, a second feeler packet including second feeler data identifying a network node and node transit log data identifying the destination node, independently of the first feeler packet;
means recorded on the recording medium for directing the system to augment, in response to the receipt at a first receiving node of a first received feeler packet having node transit log data identifying the source node, the node transit log in the first received feeler packet with data identifying the first receiving node to form an augmented first feeler packet;
means recorded on the recording medium for directing the system to send a copy of the augmented feeler packet from the first receiving node to a second randomly-selected receiving node;
means recorded on the recording medium for directing the system to seek in the first receiving node a record of a second received feeler packet having node transit log data identifying the destination node; and
means recorded on the recording medium for directing the system to combine, in response to finding the record of a second received feeler packet at the first receiving node, the node transit log data from the first and second received feeler packets to represent a path discovered for transferring at least one data packet from the source node to the destination node through the network.

22. The computer program product of claim 21 further comprising:
  means recorded on the recording medium for directing the system to send, to the source node, a copy of the combined the node transit log data representing the discovered path.

23. The computer program product of claim 22 further comprising the steps of:
  means recorded on the recording medium for directing the system to store data representing the discovered path at the source node; and
  means recorded on the recording medium for directing the system to resend the first feeler packet in response to a measure of the age of the stored path data.

24. The computer program product of claim 22 further comprising the steps of:
  means recorded on the recording medium for directing the system to store data representing the discovered path at the source node; and
  means recorded on the recording medium for directing the system to resend the first feeler packet in response to a measure of the demand at the source node for a path to the destination node.

25. The computer program product of claim 22 further comprising the steps of:
  means recorded on the recording medium for directing the system to store data representing the discovered path at the source node; and
  means recorded on the recording medium for directing the system to resend the first feeler packet in response to a measure of the cost of the path represented by the stored path data.

26. The computer program product of claim 21 further comprising:
  means recorded on the recording medium for directing the system to seek in the first receiving node a record of a second received feeler packet having node transit log data identifying the destination node as the second received feeler packet originating node.

27. The computer program product of claim 26 further comprising the steps of:
  means recorded on the recording medium for directing the system to send, to the source node, a copy of the combined the node transit log data representing the discovered path;
  means recorded on the recording medium for directing the system to store data representing the discovered path at the source node; and
  means recorded on the recording medium for directing the system to resend the first feeler packet in response to a measure of the age of the stored path data.

28. The computer program product of claim 26 further comprising the steps of:
  means recorded on the recording medium for directing the system to send, to the source node, a copy of the combined the node transit log data representing the discovered path;
  means recorded on the recording medium for directing the system to store data representing the discovered path at the source node; and
  means recorded on the recording medium for directing the system to resend the first feeler packet in response to a measure of the demand at the source node for a path to the destination node.

29. The computer program product of claim 26 further comprising the steps of:
  means recorded on the recording medium for directing the system to send, to the source node, a copy of the combined the node transit log data representing the discovered path;
  means recorded on the recording medium for directing the system to store data representing the discovered path at the source node; and
  means recorded on the recording medium for directing the system to resend the first feeler packet in response to a measure of the cost of the path represented by the stored path data.

30. The computer program product of claim 21 further comprising:
  means recorded on the recording medium for directing the system to revise the node transit log data from the first and second received feeler packets to eliminate loops from the discovered path.

* * * * *